US011223304B2

(12) United States Patent
Hossain et al.

(10) Patent No.: US 11,223,304 B2
(45) Date of Patent: Jan. 11, 2022

(54) MOTOR CONTROL SYSTEM AND METHOD FOR SELECTIVELY SHORTING MOTOR WINDINGS

(71) Applicant: MANDO CORPORATION, Gyeonggi-do (KR)

(72) Inventors: Shakil Hossain, Saginaw, MI (US); Lucas Ritter, Saginaw, MI (US); Awab Ali, Saginaw, MI (US); Tomy Sebastian, Saginaw, MI (US); Kade Hudson, Midland, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 18 days.

(21) Appl. No.: 16/835,224

(22) Filed: Mar. 30, 2020

(65) Prior Publication Data

US 2020/0321893 A1   Oct. 8, 2020

Related U.S. Application Data

(60) Provisional application No. 62/829,496, filed on Apr. 4, 2019.

(51) Int. Cl.
*H02P 3/22*   (2006.01)
*B62D 5/04*   (2006.01)

(52) U.S. Cl.
CPC ............... *H02P 3/22* (2013.01); *B62D 5/046* (2013.01); *B62D 5/0463* (2013.01)

(58) Field of Classification Search
USPC ....... 318/379, 258, 261, 269, 299, 508, 759, 318/765
See application file for complete search history.

(56) References Cited

U.S. PATENT DOCUMENTS 5,119,000 A * 6/1992 Schultz .................... H02P 7/04
318/293
5,825,641 A * 10/1998 Mangtani .......... H02M 7/53875
363/98

(Continued)

FOREIGN PATENT DOCUMENTS

EP       3 012 966      4/2016
JP       2010-51111     3/2010

(Continued)

OTHER PUBLICATIONS

International Search Report for PCT/KR2020/004530 dated Jul. 29, 2020.

(Continued)

*Primary Examiner* — Jorge L Carrasquillo
(74) *Attorney, Agent, or Firm* — Ladas & Parry, LLP

(57) ABSTRACT

A motor control system comprises: a motor comprising motor windings; and electric control units connected with the motor, each of the electric control units comprising an inverter. One of the electric control units comprises: a direct current (DC) bus; first switches, each of the first switches connected with a respective one of the motor windings; second switches, each of the second switches connected with the DC bus and a respective one of the motor windings; a first switch driver generating drive signals to drive the first and second switches; pull up resistors, each of the pull up resistors connected between the DC bus and a respective one of the second switches. The voltage pulled up by the pull up resistors can force the second switches to be turned on to short the motor windings in a state that the first switch driver does not generate the drive signals.

17 Claims, 3 Drawing Sheets

(56) References Cited

U.S. PATENT DOCUMENTS

| | | | |
|---|---|---|---|
| 7,629,787 B2* | 12/2009 | Lu ........................ | G01R 15/146 |
| | | | 324/765.01 |
| 7,728,535 B2* | 6/2010 | Kumar ...................... | B60L 7/10 |
| | | | 318/362 |
| 9,731,607 B1* | 8/2017 | Ratadiya ................... | B60L 7/08 |
| 2005/0053367 A1* | 3/2005 | Fulton ............... | H02M 7/53875 |
| | | | 388/814 |
| 2019/0031232 A1 | 1/2019 | Kumagai et al. | |

FOREIGN PATENT DOCUMENTS

| | | |
|---|---|---|
| JP | 6157752 | 6/2017 |
| JP | 2018-137952 | 8/2018 |
| KR | 10-2014-0071704 | 6/2014 |

OTHER PUBLICATIONS

Written Opinion of the International Searching Authority for PCT/KR2020/004530 dated Jul. 29, 2020.

* cited by examiner

MOTOR CONTROL SYSTEM AND METHOD FOR SELECTIVELY SHORTING MOTOR WINDINGS

CROSS REFERENCE TO PARENT APPLICATION(S)

This application claims the benefit of U.S. Patent Application Ser. No. 62/829,496, filed on Apr. 4, 2019, entitled "SSR Controlled BJT; Depletion FET Controlled BJT; Low Side MOSFET Turn ON with Resistor; Depletion Mode MOSFET; Enhancement Mode MOSFET", which is all hereby incorporated herein by reference in its entirety.

CROSS REFERENCE TO RELATED PATENT APPLICATION(S)

This application is related to U.S. patent application Ser. No. 16/664,760, filed on Oct. 25, 2019, entitled "MOTOR CONTROL SYSTEM AND METHOD FOR SELECTIVELY SHORTING MOTOR WINDINGS", and U.S. patent application Ser. No. 16/833,437, filed on Mar. 27, 2020, entitled "MOTOR CONTROL SYSTEM AND METHOD FOR SELECTIVELY SHORTING MOTOR WINDINGS", which are all hereby incorporated herein by reference in their entireties.

BACKGROUND

The present disclosure generally relates to a system, apparatus and method for controlling a motor. More specifically, some embodiments of the present disclosure relate to a motor control and method for selectively shorting motor winding such that braking torque can be produced by the motor.

Vehicles require a steering system to control the direction of travel. Previously, mechanical steering systems have been used. Mechanical steering systems typically include a mechanical linkage or a mechanical connection between a steering wheel and vehicle's road wheels. Thus, movement of the steering wheel causes a corresponding movement of the road wheels. Movement of such mechanical systems is often power assisted through the use of hydraulic assists or electric motors.

The mechanical steering systems are being replaced or supplemented by electrically driven steering systems, commonly known as "steer-by-wire" systems. Such steer-by-wire systems to varying extents replace, for example, the mechanical linkage between the steering wheel and the vehicle wheels with an electrically assisted actuator. The steer-by-wire system aims to eliminate physical or mechanical connection between a steering wheel and vehicle wheels by using electrically controlled motors change the direction of the vehicle wheels and to provide feedback to a driver.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

Various embodiments of the present disclosure may provide a motor control system configured to short motor windings of a motor so that the motor generates braking torque when all or some electric control units of the motor are inactive, disabled or failed. For example, the motor control system may use pull up resistors to supply voltage of power source, such as a battery, to some switches of an inverter, for example, but not limited to, lower side switches, so that the motor windings of the motor can be shorted.

According to some embodiments of the present disclosure, a motor control system may comprise: a motor comprising a plurality of motor windings; and a plurality of electric control units electrically connected with the motor, each of the electric control units comprising an inverter configured to receive direct current (DC) voltage and output alternating current (AC) voltage to the motor windings to control the motor. At least one of the electric control units may comprise: a DC, bus connected to a power source; first switches, each of the first switches connected with a respective one of the motor windings; second switches, each of the second switches connected with the DC bus and a respective one of the motor windings, wherein each of the second switches is paired with a respective one of the first switches; a first switch driver configured to generate drive signals to drive the first and second switches; first resistors, each of the first resistors connected between the DC bus and a respective one of the second switches. The first resistors may be configured to pull up the voltage supplied to the second switches by the DC bus.

Additionally, according to certain embodiments of the present disclosure, the motor control system may further comprise a switching module configured to selectively connect or disconnect motor shorting components with or from the DC bus. The switching module may comprise a fourth switch connected between the DC bus and the first resistors.

The DC bus may be configured to supply voltage to the second switches through the first resistors (or through the fourth switch and the first resistors), each of the first resistors connected between the DC bus and a respective one of the second switches, so that the second switches can short the motor windings in a state that the first switch driver does not generate the drive signals (for example, the first switch driver is inactive, disabled, failed, or in a high impedance status). The DC bus may be configured to turn on the second switches by supplying voltage, pulled up by the first resistors, to the second switches to short the motor windings in a state that the first switch driver does not generate the drive signals.

The first switch driver may be configured to generate one or more of the drive signals that control the second switches not to short the motor windings.

At least one of the electric control units may further comprise second resistors. The second resistors may have greater resistance than the first resistors. Each of the second resistors is connected with a respective one of the second switches so that one or more of the drive signals of the first switch driver input to the second switches can cause the second switches not to short the motor windings.

At least one of the electric control units may further comprises: third switches, each of the third switches connected between a respective one of the motor windings and a point between the paired first and second switches; and a second switch driver configured to control the third switches to selectively connect or disconnect the at least one of the electric control units with the motor windings.

According to certain embodiments of the present disclosure, a motor control system may comprise: a motor comprising a plurality of motor windings; a plurality of electric control units electrically connected with the motor, each of the electric control units comprising an inverter configured to receive direct current (DC) voltage and output alternating current (AC) voltage to the motor windings to control the motor, wherein at least one of the electric control units comprises: a DC bus connected to a power source, the DC bus having first and second nodes; a first switch driver configured to generate drive signals to drive first and second switches; the first switches, one of the first switches having a first terminal connected with the first node of the DC bus, a second terminal configured to receive one of the drive signals of the first switch driver, and a third terminal connected with one of the second switches and one of the motor windings; the second switches, the one of the second switches having a first terminal connected with the one of the first switches and the one of the motor windings, a second terminal configured to receive another of the drive signals of the first switch driver, and a third terminal connected with the second node of the DC bus, and the first resistors, the one of the first resistors connected between the first node of the DC bus and the second terminal of the one of the second switches. The first resistors may be configured to pull up the voltage supplied to the second switches by the DC bus.

The second switches may be configured to be turned on by voltage of the DC bus supplied through the first resistors so that the second switches can short the motor windings to the second node of the DC bus in a state that the first switch driver does not generate the drive signals.

The at least one of the electric control units may further comprise second resistors. One of the second resistors having greater resistance than the first resistors may be connected between the second and third terminals of the one of the second switches. The first switch driver may be configured to output, to the second switches, one or more of the drive signals that control the second switches not to short the motor windings.

The at least one of the electric control units may further comprise: third switches, one of the third switches connected between the one of the motor windings and a point between the third terminal of the one of the first switches and the first terminal of the one of the second switches; and a second switch driver configured to control the third switches to selectively connect or disconnect the at least one of the electric control units with the motor windings.

The DC bus may be configured to, when all of the electric control units are disabled, supply voltage to the second switches of the at least one of the electric control units through the first resistors so that the second switches of the at least one of the electric control units can short the motor windings.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
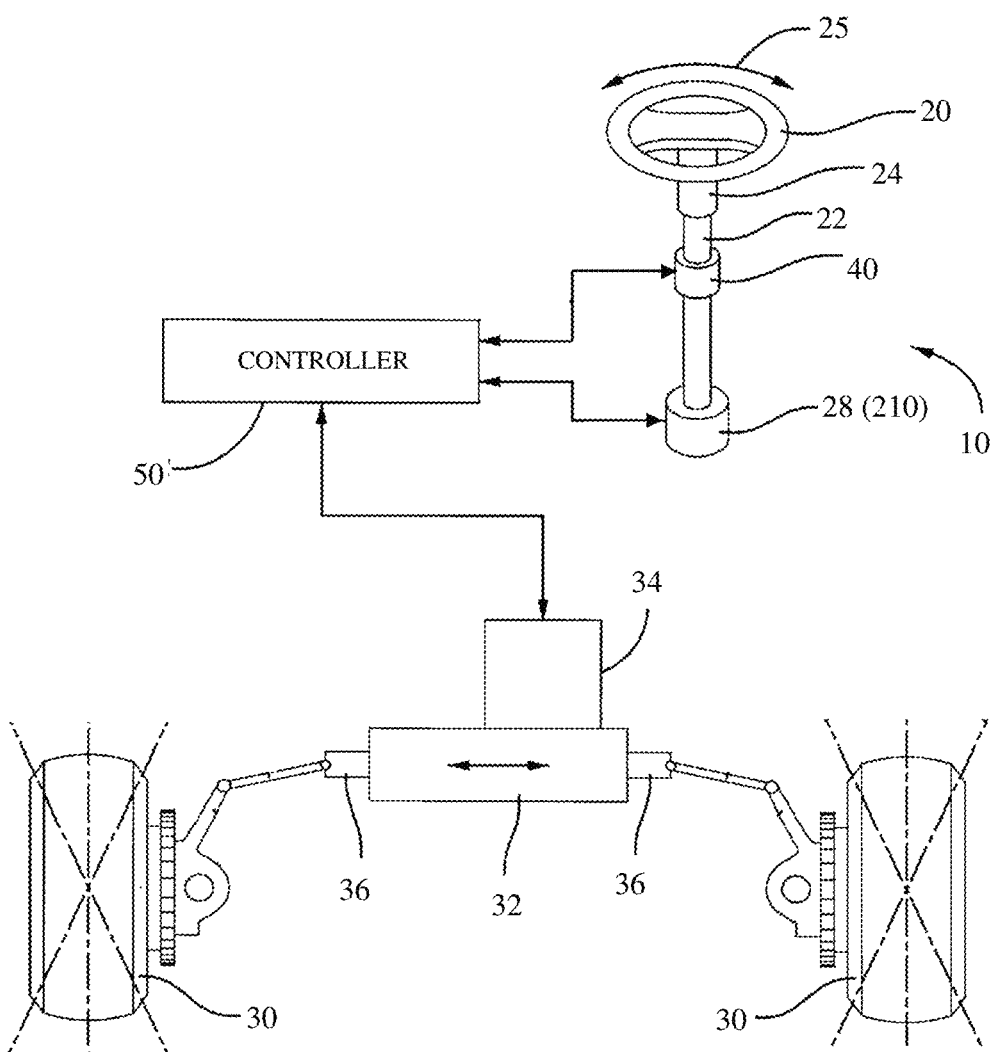
FIG. 1 is a schematic view of a vehicle including a steer-by-wire system according to an embodiment of the present disclosure.

Referring now to FIG. 1, a steer-by-wire system 10 for use in a vehicle 1 is illustrated. The steer-by-wire system 10 allows a driver or operator of the vehicle 1 to control the direction of the vehicle 1 or road wheels 30 of the vehicle 1 through the manipulation of a steering wheel 20. The steering wheel 20 is operatively coupled to a steering shaft (or steering column) 22. The steering wheel 20 may be directly or indirectly connected with the steering shaft 22. For example, the steering wheel 20 may be connected to the steering shaft 22 through a gear, a shaft, a belt and/or any connection means. The steering shaft 22 may be installed in a housing 24 such that the steering shaft 22 is rotatable within the housing 24.

The vehicle wheels 30 may be connected to knuckles, which are in turn connected to tie rods. The tie rods are connected to a steering assembly 32. The steering assembly 32 may include a steering actuator motor 34 (e.g. an electric motor) and steering rods 36. The steering rods 36 may be operatively coupled to the steering actuator motor 34 such that the steering actuator motor 34 is adapted to move the steering rods 36. The movement of the steering rods 36 controls the direction of the road wheels 30 through the knuckles and tie rods.

One or more sensors 40 may configured to detect position, angular displacement or travel 25 of the steering shaft 22 or steering wheel 20, as well as detecting the torque of the angular displacement. The sensors 40 provide electric signals to a controller 50 indicative of the angular displacement and torque 25. The controller 50 sends and/or receives signals to/from the steering actuator motor 34 to actuate the steering actuator motor 34 in response to the angular displacement 25 of the steering wheel 20.

In use, the steering wheel 20 is angularly displaced 25 such that the steering shaft 22 can be also angularly displaced. The sensors 40 detect the angular displacement and torque 25 of the steering shaft 22, and the sensors 40 send signals to the controller 50 indicative of the relative amount of angular displacement of the steering shaft 22. The controller 50 sends signals to the steering actuator motor 34 indicative of the relative amount of the angular displacement 30. In response, the steering actuator motor 34 moves the steering rod 36 laterally so that the road wheels 30 are turned. Thus, the controller 50 controls the distance that the steering rod 36 is moved based on the amount of the angular displacement 25 of the steering shaft 22. Movement of the steering rod 36 manipulates the tie rods and knuckles to reposition the road wheels 30 of vehicle 1. Accordingly, when the steering wheel 20 is turned, the road wheels 30 are turned.

In the steer-by-wire steering system, the steering wheel 20 may be mechanically isolated from the road wheels 30. For example, the steer-by-wire system has no mechanical link connecting the steering wheel 25 from the road wheels 30. Accordingly, the steer-by wire steering system needs to provide the driver or operator with the same "road feel" that the driver receives with a direct mechanical link. Furthermore, it is desirable to have a device that provides a mechanical back up "road feel" in the event of multiple electronic failures in the steer-by-wire system. In addition, a device that provides positive on-center feel and accurate torque variation as the handwheel is rotated is also desirable.

Therefore, the vehicle 1 may comprise a feedback actuator (FBA) or steering feel actuator (SFA) 28. The feedback actuator or steering feel actuator 28 may comprise an electric motor (e.g. a motor 210 of FIG. 2) which is connected to the steering shaft or steering column 22. For example, a gear or belt assembly may connect an output of the feedback actuator 28 to the steering shaft 22. Alternatively, the feedback actuator 28 may be directly coupled to the steering shaft 22. The feedback actuator 28 is actuatable to provide resistance to rotation of the steering wheel 20. The controller 50 is operatively coupled to the sensors 40 and to the feedback actuator 28. The controller 50 receives signals indicative of the applied torque and angular rotation of the steering wheel 20 from the sensors 40. In response to the signals from the sensors 40, the controller 50 generates and transmits a signal corresponding to the sensed torque and angular rotation of the steering wheel 20 sensed by the sensors 40 and the feedback actuator 28 generates resistance torque to the rotation of the steering wheel 20 in response to the signal of the controller 50 to provide the road feel to the driver. However, when the feedback of the feedback actuator 28 is removed due to system failures such as inverter and it's control failures, the driver will have the uncomfortable feeling of being separated from the road wheels, not quite in control, and will tend to oversteer the vehicle, particularly in demanding situations such as sharp or sudden turns.

Therefore, according to some embodiments of the present disclosure, a motor control system is configured to short motor windings of a motor included in, for example, but not limited to, the feedback actuator or steering feel actuator with battery power available in a vehicle so that the motor provides the braking torque to the steering wheel when all or some electric control units of the feedback actuator or steering feel actuator are disabled or failed. This may prevent the driver oversteer.

Figure 2:
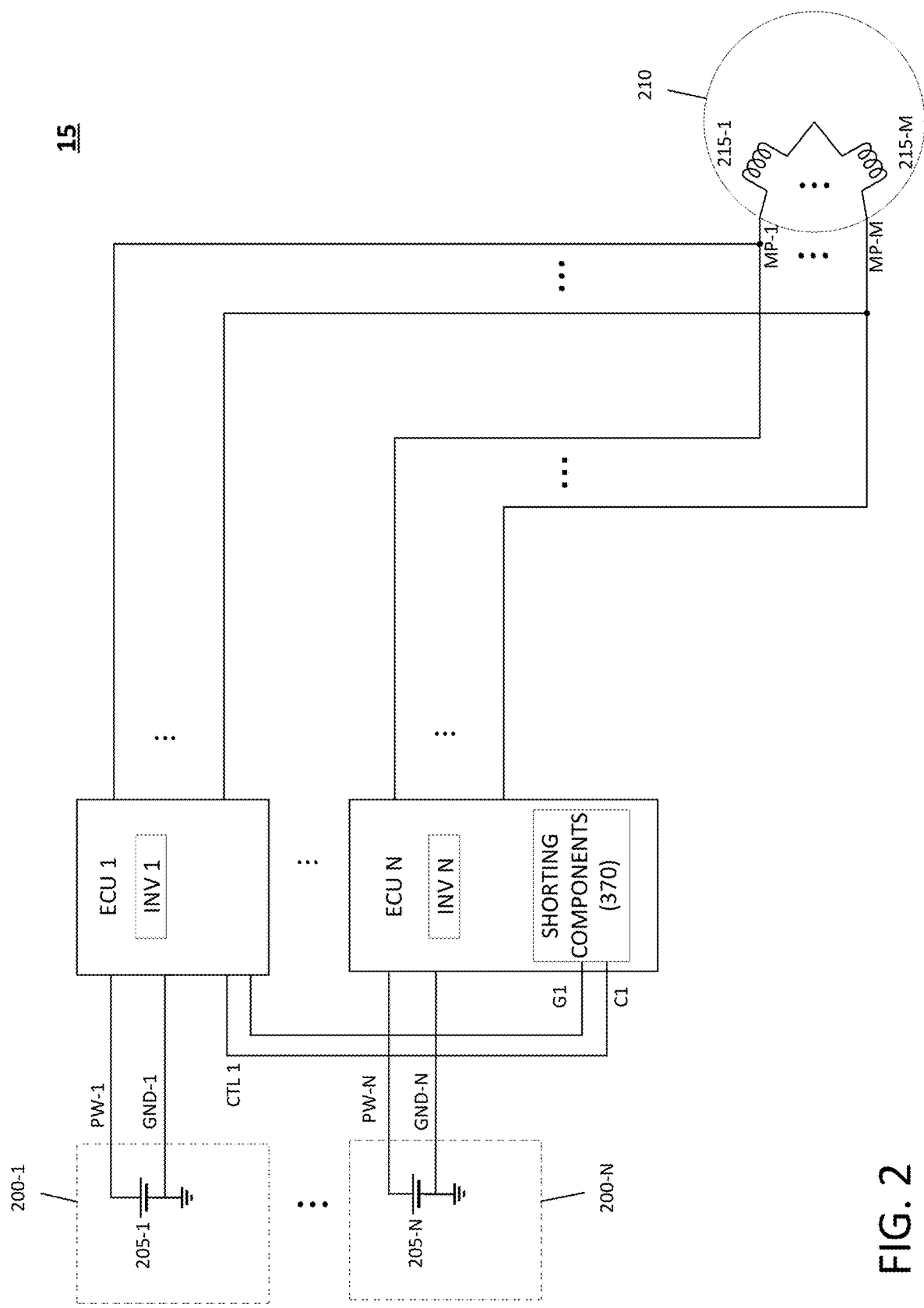
FIG. 2 is a schematic diagram of a motor control system according to an embodiment of the present disclosure.

FIG. 2 is a schematic diagram of a motor control system according to an embodiment of the present disclosure.

Power sources 200-1 to 200-N (N is a positive integer more than 1) are configured to supply power to a respective one of electric control units (ECUs) 1 to N. The power sources 200-1 to 200-N supply power to a respective one of ECUs 1 to N. For example, the power sources 200-1 to 200-N may be batteries 205-1 to 205-N. The power sources 200-1 to 200-N may be electrically connected to the ECUs 1 to N through power lines PW-1 to PW-N and ground lines GND-1 to GND-N, respectively.

The motor 210 may be, for example, but not limited to, a multi-phase motor comprising a plurality of motor windings 215-1 to 215-M (M is a positive integer more than 1). The motor 210 may have a plurality of motor phase terminals MP-1 to MP-M connected to a respective one of the motor windings 215-1 to 215-M. For example, the motor 210 may be a multi-phase AC permanent magnet motor. In the exemplary embodiment shown in FIG. 3, the motor 210 may be a three-phase permanent magnet motor having a U-phase winding 215-1, a V-phase winding 215-2, and a W-phase winding 215-3, but it should be appreciated that embodiments of the present disclosure should not be limited to such. One having ordinary skill in the art would understand that the present disclosure can be implemented with a two-phase motor or a more than three-phase motor.

The ECUs 1 to N comprise multi-phases (M-phases) inverters INVs 1 to N, respectively. The inverters INVs 1 to N are coupled to the motor phase terminals MP-1 to MP-M connected to a respective one of the motor windings 215-1 to 215-M. The inverters INVs 1 to N receive power from the power sources 200-1 to 200-N, and convert direct current (DC) voltage provided from the power sources 200-1 to 200-N to alternating currents (AC) voltage. The outputs generated by the inverters INVs 1 to N are applied to the motor windings 215-1 to 215-M through the motor phase terminals MP-1 to MP-M to drive the multi-phase (M-phase) motor 210.

The ECUs 1 to N may have, for example, but not limited to, one or more of a circuit, microprocessor or computer, which monitors and physically alters the operating conditions of the motor control system 15. The ECUs 1 to N may also be configured to accept input and output from a wide array of input and output devices for receiving or sending values.

One or more of the ECUs 1 to N may include motor shorting components 370 connected to its or their inverters. The motor shorting components 370 may be configured to selectively short the motor phase terminals MP-1 to MP-M or to control or cause the inventor INV N to short the motor phase terminals MP-1 to MP-M in a state that all ECUs 1 to N are inactive, disabled, failed or in a high impedance state. For example, when all ECUs 1 to N receive no drive signal from any switch driver driving switches included an inverter, the motor shorting components 370 are configured to short the motor phase terminals MP-1 to MP-M so that the motor 210 can generate the braking torque. However, when at least one of the ECUs 1 to N receive a drive signal from the switch driver (for example, any one of the ECUs 1 to N is enabled), the short of the motor phase terminals MP-1 to MP-M is removed or the motor phase terminals MP-1 to MP-M are not shorted. For example, the motor shorting components 370 of the ECU N may be connected with the ECUs 1 to N to receive control signals CTL-1 to CTL-(N) from the ECUs 1 to N, respectively. The motor shorting components 370 of the ECU N do not short the motor windings 215-1, 215-2, 215-3, release the short of the motor windings 215-1, 215-2, 215-3 when the motor shorting components 370 of the ECU N receive at least one of the control signals CTL-1 to CTL-(N) from the ECUs 1 to N. The control signal CTL-1 to CTL-(N) may be generated by the ECU 1 to N when the ECU 1 to N is properly initialized or activated or is in an active status.

Figure 3:
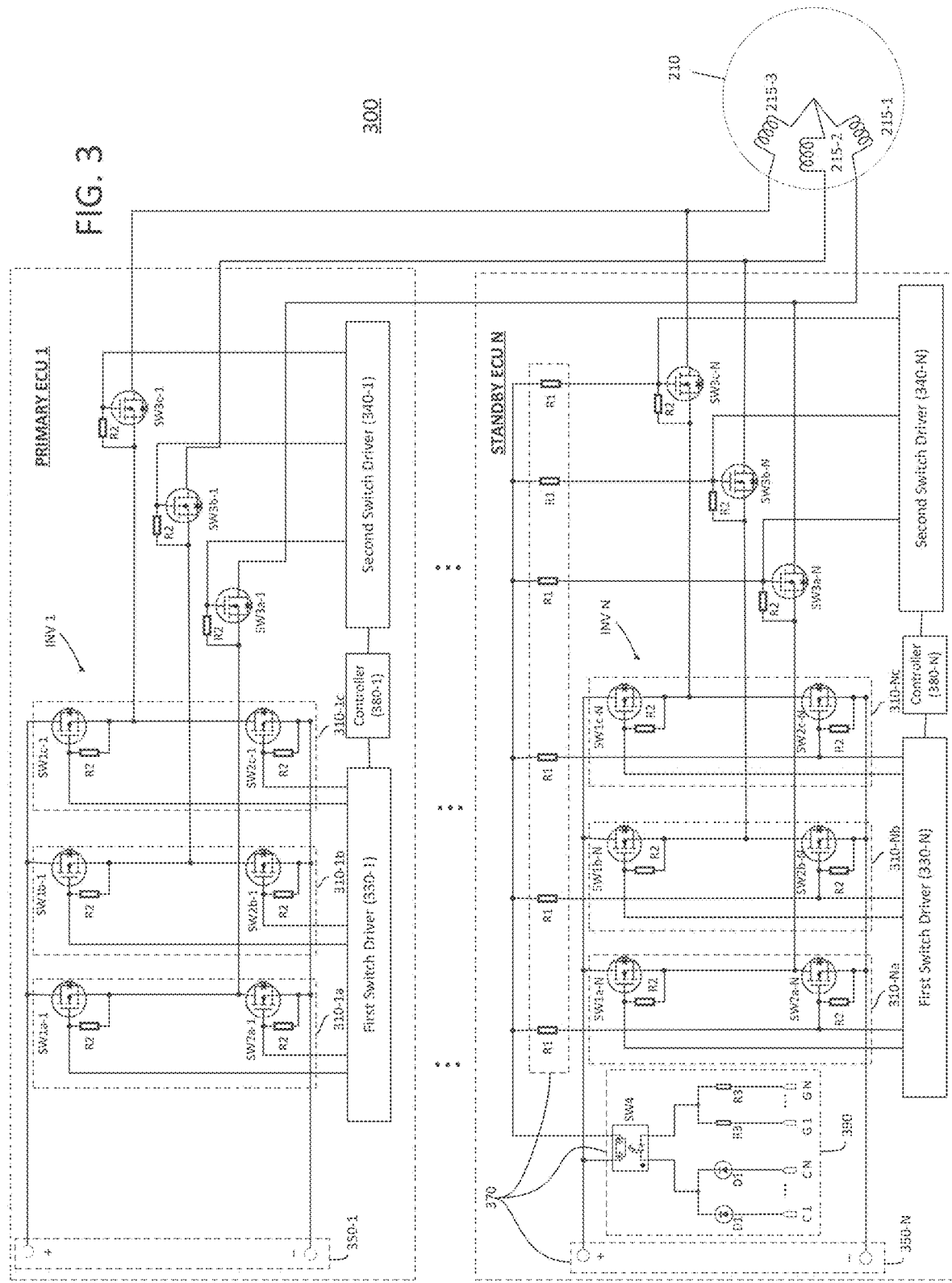
FIG. 3 is a conceptual circuit diagram of a motor control system comprising components for selectively shorting motor windings according to an embodiment of the present disclosure.

FIG. 3 is a conceptual circuit diagram of a motor control system comprising components for selectively shorting motor phase terminals according to an embodiment of the present disclosure. It should be noted that a three-phase motor 210 in FIG. 3 is not limited to this implementation; rather, FIG. 3 is merely one example of how the three-phase motor 210 could be implemented in one implementation. One having ordinary skill in the art would understand that the present disclosure can be implemented with, a more than three-phase motor.

The DC bus 350-1 may be configured to supply power to the primary ECU 1. The DC bus 350-1 may be connected to the power source 200-1 of FIG. 2. The power source may be, for example, but not limited to, one or more DC batteries, fuel cell(s), generator(s), power converter(s) or the like. For instance, a first node (e.g. a positive node or a high voltage node) of the DC bus 350-1 is connected to the battery 205-1 through the power line PW-1, and a second node (e.g. a negative node or a low voltage node) of the DC bus 350-1 is connected to the battery 205-1 through the ground line GND-1.

A primary ECU 1 may comprise the inverter INV 1. The inverter INV 1 may be configured to provide controlled electric power with variable magnitude and frequency to the motor 210. The inverter INV 1 may comprise a first inverter sub-module 310-1a comprising a first switch SW1a-1 and a second switch SW2a-1, a second inverter sub-module 310-1b comprising a first switch SW1b-1 and a second switch SW2b-1, and a third inverter sub-module 310-1c comprising a first switch SW1c-1 and a second switch SW2c-1. The first switches SW1a-1, SW1b-1, SW1c-1 and the second switches SW2a-1, SW2b-1, SW2c-1 are organized in pairs with each pair connected to a respective phase. In this embodiment, in phase U the first inventor sub-module 310-1a is coupled to the motor winding 215-1, in phase V the second inventor sub-module 310-1b is coupled to the motor winding 215-2, and in phase W the third inventor sub-module 310-1c is coupled to the motor winding 215-3. As shown in FIG. 2, the motor windings 215-1, 215-2, 215-3 are connected together at a neutral point. The current into the motor winding 215-1 flows out the motor windings 215-2, 215-3, the current into the motor winding 215-2 flows out the motor windings 215-1, 215-3, and the current into the motor winding 215-3 flows out the motor windings 215-1, 215-2. And, the current out of the motor winding 215-1 flows into the motor windings 215-2, 215-3, the current out of the motor winding 215-2 flows into the motor windings 215-1, 215-3, and the current out of the motor winding 215-3 flows into the motor windings 215-1, 215-2.

The switches SW1a-1, SW1b-1, SW1c-1, SW2a-1, SW2b-1, SW2c-1 may be any suitable switching devices, such as metal-oxide-semiconductor field-effect transistors (MOSFETs), insulated gate bipolar transistors (IGBTs), or any other suitable power semiconductor or transistor devices. In the exemplary embodiment shown in FIG. 3, the switches SW1a-1, SW1b-1, SW1c-1, SW2a-1, SW2b-1, SW2c-1 are illustrated as a n-channel enhancement mode MOSFET, but not limited thereto. The switches SW1a-1 SW1b-1, SW1c-1 SW2a-1, SW2b-1, SW2c-1 may further include integrated free-wheeling diode. Alternatively, the freewheeling diodes may be provided separately and placed in parallel with the switches SW1a-1, SW1b-1, SW1c-1, SW2a-1, SW2b-1, SW2c-1.

The inverter INV 1 has three first switches SW1a-1, SW1b-1, SW1c-1 (upper side switches) and three second switches SW2a-1, SW2b-1, SW2c-1 (lower side switches) to appropriately switch voltage and provide three-phase energization of the motor windings 215-1, 215-2, 215-3 of the motor 210. A first terminal (e.g. drain) of the first switch SW1a-1, SW1b-1, SW1c-1 is connected with the first node (e.g. a high voltage node) of the DC bus 350-1, a second terminal (e.g. gate) of the first switch SW1a-1, SW1b-1, SW1c-1 is connected to the first switch driver (e.g. inverter gate driver) 330-1, and a third terminal (e.g. source) of the first switch SW1a-1, SW1b-1, SW1c-1 is connected with a respective one of the second switches SW2a-1, SW2b-1, SW2c-1 and a respective one of the motor windings 215-1, 215-2, 215-3. A first terminal (e.g. drain) of the second switch SW2a-1, SW2b-1, SW2c-1 is connected with a respective one of the first switches SW1a-1, SW1b-1, SW1c-1 and a respective one of the motor windings 215-1, 215-2, 215-3, a second terminal (e.g. gate) of the second switch SW2a-1, SW2b-1, SW2c-1 is connected to the first switch driver (e.g. inverter gate driver) 330-1, and a third terminal (e.g. source) of the second switch SW2a-1, SW2b-1, SW2c-1 is connected with the second node (e.g. a low voltage node) of the DC bus 350-1. Further, second resistors (or pull down resistors) R2 may be connected with the switches SW1a-1, SW1b-1, SW1c-1. SW2a-1. SW2b-1, SW2c-1. For example, the pull down resistor R2 may be connected between the second terminal (e.g. gate) and the third terminal (e.g. source) of the switch SW1a-1, SW1b-1, SW1c-1, SW2a-1, SW2b-1, SW2c-1.

The first switch driver (e.g. inverter gate driver) 330-1 is configured to control the first inverter INV 1 and render direction, torque or speed control output from the motor 210. The first switch driver 330-1 may accomplish this task using several tools and can include any suitable processor configured to execute control logic that may control the inverter INV 1 and the motor 210. The first switch driver 330-1 may be configured to generate drive signals and output the drive signals to the switches SW1a-1, SW1b-1, SW1c-1, SW2a-1, SW2b-1, SW2c-1 in order to control the on and off of the switches SW1a-1, SW1b-1, SW1c-1 SW2a-1, SW2b-1, SW2c-1 according to pulse width modulation (PWM) duty-cycle commands received from the controller 380. The drive signals of the first switch driver 330-1 may turn on or off the switches SW1a-1, SW1b-1, SW1c-1, SW2a-1, SW2b-1, SW2c-1 in order to regulate the fundamental component of the phase voltage of the motor 210 to a desired amplitude, phase, and frequency. The first switch driver 330-1 may also include any other suitable devices or modules, such as ancillary devices like clocks, power supplies, and the like. Moreover, any other suitable devices can be placed in communication with other components, such as one or more sensors, other controllers, or the like.

The first inverter INV 1 may be directly connected to the motor 210. Alternatively, the first inverter INV 1 may be indirectly connected to the motor 210. For example, as shown in FIG. 3, third switches SW3a-1, SW3b-1, SW3c-1 are connected between outputs of the invertor sub-modules 310-1a, 310-1b, 310-1c (e.g. a point between the first switch SW1a-1, SW1b-1, SW1c-1 and the second switch SW2a-1, SW2b-1, SW2c-1) and the motor windings 215-1, 215-2, 215-3, respectively. A second switch driver (e.g. phase disconnect gate driver) 340-1 may be configured to generate control signals to the third switches SW3a-1, SW3b-1, SW3c-1 to turn on or off the third switches SW3a-1, SW3b-1, SW3c-1. First terminals (e.g. drain) of the third switches SW3a-1, SW3b-1, SW3c-1 are connected with the motor windings 215-1, 215-2, 215-3, respectively, second terminals (e.g. gate) of the third switches SW3a-1, SW3b-1, SW3c-1 are connected with the second switch driver (e.g. phase disconnect gate driver) 340-1 to receive gate drive signals, and third terminals (e.g. source) of the third switches SW3a-1, SW3b-1, SW3c-1 are connected with the inverter sub-modules 310-1a, 310-1b, 310-1c, respectively. The second resistor (e.g. pull down resistor) R2 may be connected between the second terminal (e.g. gate) and the third terminal (e.g. source) of the third switches SW3a-1, SW3b-1, SW3c-1. When the third switches SW3a-1, SW3b-1, SW3c-1 are turned off (i.e. open), the first inverter INV 1 of the primary ECU 1 is disconnected from the motor 210 and/or other ECUs 2 to N. However, when the third switches SW3a-1, SW3b-1, SW3c-1 are turned on (i.e. closed), the first inverter INV 1 of the primary ECU 1 is connected with the motor 210. For instance, normally the third switches SW3a-1, SW3b-1, SW3c-1 are turned on, but only at predetermined conditions (such as preset failure conditions of the primary ECU 1) the second switch driver 340-1 can turn off the third switches SW3a-1, SW3b-1, SW3c-1 to disconnect the first inverter INV 1 of the primary ECU 1 from the motor 210 and/or other ECUs 2 to N in order to protect the motor 210 and/or other ECUs 2 to N.

The motor control system 300 may have one or more additional ECUs which are duplicates of the primary ECU 1 described above. For example, the ECUs 2 to N-1 can have the same components, configurations, operation and connections as the primary ECU 1. The ECUs 2 to N-1 are redundancy of the primary ECU 1 to back up the primary ECU 1. When the primary ECU 1 is active, the first and second switches included in the ECUs 2 to N-1 may be turned off while the third switches comprised in the ECUs 2 to N-1 may be turned on.

The motor control system 300 may further comprise a standby ECU N. When all of the ECUs 1 to N-1 of FIG. 2 are disabled, the standby ECU N can drive the motor 210.

The standby ECU N may include some or all components comprised in the primary ECU 1. And, additional or alternative components, such as motor shorting components 370, may be comprised in the standby ECU N.

The DC bus 350-N may be configured to supply power to the standby ECU N. The DC bus 350-N may be connected to the power source 200-N of FIG. 2. The power source may be, for example, but not limited to, one or more DC batteries, fuel cell(s), generator(s), power converter(s) or the like. For instance, a first node (e.g. a positive node or a high voltage node) of the DC bus 350-N is connected to the battery 205-N through the power line PW-N, and a second node (e.g. a negative node or a low voltage node) of the DC bus 350-N is connected to the battery 205-N through the ground line GND-N.

The standby ECU N may comprise the inverter INV N. The inverter INV N may be configured to provide controlled electric power with variable magnitude and frequency to the motor 210. The inverter INV N may comprise a first inverter sub-module 310-Na comprising a first switch SW1a-N and a second switch SW2a-N, a second inverter sub-module 310-Nb comprising a first switch SW1b-N and a second switch SW2b-N, and a third inverter sub-module 310-Nc comprising a first switch SW1c-N and a second switch SW2c-N. The first switches SW1a-N, SW1b-N, SW1c-N and the second switches SW2a-N, SW2b-N, SW2c-N are organized in pairs with each pair connected to a respective phase. In this embodiment, in phase U the first inventor sub-module 310-Na is coupled to the motor winding 215-1, in phase V the second inventor sub-module 310-Nb is coupled to the motor winding 215-2, and in phase W the third inventor sub-module 310-Nc is coupled to the motor winding 215-3. As shown in FIG. 2, the motor windings 215-1, 215-2, 215-3 are connected together at a neutral point. The current into the motor winding 215-1 flows out the motor windings 215-2, 215-3, the current into the motor winding 215-2 flows out the motor windings 215-1, 215-3, and the current into the motor winding 215-3 flows out the motor windings 215-1, 215-2. And the current out of the motor winding 215-1 flows into the motor windings 215-2, 215-3, the current out of the motor winding 215-2 flows into the motor windings 215-1, 215-3, and the current out of the motor winding 215-3 flows into the motor windings 215-1, 215-2.

The switches SW1a-N, SW1b-N, SW1c-N, SW2a-N, SW2b-N, SW2c-N may be any suitable switching devices, such as MOSFETs, IGBTs, or any other suitable power semiconductor or transistor devices. In the exemplary embodiment shown in FIG. 3, the switches SW1a-N, SW1b-N, SW1c-N, SW2a-N, SW2b-N, SW2c-N are illustrated as a n-channel enhancement mode MOSFET, but not limited thereto. The switches SW1a-N, SW1b-N, SW1c-N, SW2a-N SW2b-N, SW2c-N: may further include integrated free-wheeling diode. Alternatively, the freewheeling diodes may be provided separately and placed in parallel with the switches SW1a-N, SW1b-N, SW1c-N, SW2a-N, SW2b-N, SW2c-N.

The inverter INV N has three first switches SW1a-N, SW1b-N, SW1c-N (upper side switches) and three second switches SW2a-N, SW2b-N, SW2c-N (lower side switches) to appropriately switch voltage and provide three-phase energization of the motor windings 215-1, 215-2, 215-3 of the motor 210. A first terminal (e.g. drain) of the first switch SW1a-N, SW1b-N, SW1c-N is connected with the first node (e.g. high voltage node) of the DC bus 350-N, a second terminal (e.g. gate) of the first switch SW1a-N, SW1b-N, SW1c-N is connected to the first switch driver (e.g. inverter gate driver) 330-N, and a third terminal (e.g. source) of the first switch SW1a-N, SW1b-N, SW1c-N is connected with a respective one of the second switches SW2a-N, SW 2b-N, SW2c-N and a respective one of the motor windings 215-1, 215-2, 215-3. A first terminal (e.g. drain) of the second switch SW2a-N, SW2b-N, SW2c-N is connected with a respective one of the first switches SW1a-N, SW1b-N, SW1c-N and a respective one of the motor windings 215-1, 215-2, 215-3, a second terminal (e.g. gate) of the second switch SW2a-N, SW2b-N, SW2c-N is connected to the first switch driver (e.g. inverter gate driver) 330-N, and a third terminal (e.g. source) of the second switch SW2a-N, SW2b-N, SW2c-N is connected with the second node (e.g. low voltage node) of the DC bus 350-N.

Additionally, in the standby ECU N, the second terminals (e.g. gate) of the second switches SW2a-N, SW2b-N, SW2c-N (lower side switches) may be further connected with the first node (e.g. high voltage node) of the DC bus 350-N through first resistors R1 and the fourth switch SW4. This will be described in further detail below. Further, second resistors (or pull down resistors) R2 may be connected with the switches SW1a-N, SW1b-N, SW1c-N, SW2a-N, SW2b-N, SW2c-N. For example, the pull down resistor R2 may be connected between the second terminal (e.g. gate) and the third terminal (e.g. source) of the switch SW1a-N, SW1b-N, SW1c-N, SW2a-N, SW2b-N, SW2c-N.

The first switch driver (e.g. inverter gate driver) 330-N is configured to control the N-th inverter INV N and render torque or speed control output from the motor 210. The first switch driver 330-N may accomplish this task using several tools and can include any suitable processor configured to execute control logic that may control the inverter INV N and the motor 210. The first switch driver 330-N may be configured to generate drive signals and output the drive signals to the switches SW1*a*-N, SW1*b*-N, SW1*c*-N, SW2*a*-N, SW2*b*-N, SW2*c*-N in order to control the turn on and off of the switches SW1*a*-N, SW1*b*-N, SW1*c*-N, SW2*a*-N, SW2*b*-N, SW2*c*-N according to pulse width modulation (PWM) duty-cycle commands. The drive signals of the first switch driver 330-N may turn on and off the switches SW1*a*-N, SW1*b*-N, SW1*c*-N, SW2*a*-N, SW2*b*-N, SW2*c*-N in order to regulate the phase voltage of the motor 210 to a desired amplitude, phase, and frequency. The first switch driver 330-N may also include any other suitable devices or modules, such as ancillary devices like clocks, power supplies, and the like. Moreover, any other suitable devices can be placed in communication with other components, such as one or more sensors, other controllers or drivers, or the like.

The N-th inverter INV N may be directly connected to the motor 210. Alternatively, the N-th inverter INV N may be indirectly connected to the motor 210. For example, as shown in FIG. 3, third switches SW3*a*-N, SW3*b*-N, SW3*c*-N are connected between outputs of the inverter sub-modules 310-Na, 310-Nb, 310-Nc (e.g. a point between the first switch SW1*a*-N, SW1*b*-N, SW1*c*-N and the second switch SW2*a*-N, SW2*b*-N, SW2*c*-N) and the motor windings 215-1, 215-2, 215-3, respectively. A second switch driver (e.g. phase disconnect gate driver) 340-N may be configured to generate control signals to the third switches SW3*a*-N, SW3*b*-N, SW3*c*-N to turn on and off the third switches SW3*a*-N, SW3*b*-N, SW3*c*-N. First terminals (e.g. drain) of the third switches SW3*a*-N, SW3*b*-N, SW3*c*-N are connected with the motor windings 215-1, 215-2, 215-3, respectively, second terminals (e.g. gate) of the third switches SW3*a*-N, SW3*b*-N, SW3*c*-N are connected with the second switch driver (e.g. phase disconnect gate driver) 340-N to receive gate drive signals, and third terminals (e.g. source) of the third switches SW3*a*-N, SW3*b*-N, SW3*c*-N are connected with the inverter sub-modules 310-Na, 310-Nb, 310-Nc, respectively. The second resistor (e.g. pull down resistor) R2 may be connected between the second terminal (e.g. gate) and the third terminal (e.g. source) of the third switches SW3*a*-N, SW3*b*-N, SW3*c*-N. When the third switches SW3*a*-N, SW3*b*-N, SW3*c*-N are turned off (i.e. open), the N-th inverter INV N of the standby ECU N is disconnected from the motor 210 and/or other ECUs 1 to N-1. However, when the third switches SW3*a*-N, SW3*b*-N, SW3*c*-N are turned on (i.e. closed), the first inverter INV N of the standby ECU N is connected with the motor 210. For instance, normally the third switches SW3*a*-N, SW3*b*-N, SW3*c*-N are turned on, but only at predetermined conditions (such as preset failure conditions of the standby ECU N) the second switch driver 340-N can turn off the third switches SW3*a*-N, SW3*b*-N, SW3*c*-N to disconnect the N-th inverter INV N of the standby ECU N from the motor 210 and/or other ECUs 1 to N-1 in order to protect the motor 210 and/or other ECUs 1 to N-1.

The standby ECU N comprises motor shorting components 370. The motor shorting components 370 may include first resistors (or pull up resistors) R1 and the DC bus 350-N.

The first resistors R1 may be connected between one node of the DC bus 350-N—through the fourth switch SW4—and each one of the second switches SW2*a*-N, SW2*b*-N, SW2*c*-N. For instance, the first resistor R1 may be connected between one node (e.g. high voltage node) of the DC bus 350-N and the second terminal (e.g. gate) of the second switch (e.g. lower side switch) SW2*a*-N, SW2*b*-N, SW2*c*-N, and the third terminal (e.g. source) of the second switch SW2*a*-N, SW2*b*-N, SW2*c*-N may be connected with the other node (e.g. low voltage node) of the DC bus 350-N. The first resistors R1 may be configured to pull up the voltage supplied to the second switches SW2*a*-N, SW2*b*-N, SW2*c*-N by the DC bus 350-N.

The second terminals (e.g. gate) of the second switches SW2*a*-N, SW2*b*-N, SW2*c*-N are connected with one node (e.g. high voltage node) of the DC bus 350-N through the first resistors R1 while the third terminals (e.g. source) of the second switches SW2*a*-N, SW2*b*-N, SW2*c*-N are connected with the other node (e.g. low voltage node) of the DC bus 350-N. And, the first terminals (e.g. drain) of the second switches SW2*a*-N, SW2*b*-N, SW2*c*-N are connected with the motor windings 215-1, 215-2, 215-3, respectively, so that the motor windings 215-1, 215-2, 215-3 can be electrically connected to the other node (e.g. low voltage node) of the DC bus 350-N when the second switches SW2*a*-N, SW2*b*-N, SW2*c*-N are turned on.

Additionally, the first resistors R1 may be also connected between one node of the DC bus 350-N and each one of the third switches SW3*a*-N, SW3*b*-N, SW3*c*-N. For instance, the first resistor R1 may be connected between one node (e.g. high voltage node) of the DC bus 350-N and the second terminal (e.g. gate) of the third switches SW3*a*-N, SW3*b*-N, SW3*c*-N. The first resistors R1 may be configured to pull up the voltage supplied to the third switches SW3*a*-N, SW3*b*-N, SW3*c*-N by the DC bus 350-N.

The motor shorting components 370 may further comprise a switching module 390. The switching module 390 may be configured to connect or disconnect the motor shorting components 370 with or from the DC bus 350-N in response to one or more of the control signals CTL-1 to CTL-N received from the ECUs 1 to N, respectively. For instance, when the switching module 390 receives none of the control signals CTL-1 to CTL-N of the ECUs 1 to N, the switching module 390 may be closed (i.e. on) to connect the motor shorting components 370 with the DC bus 350-N so that the motor shorting components 370 of the ECU N can short the motor windings 215-1, 215-2, 215-3 together by the voltage of the DC bus 350-N. When the switching module 390 receives at least one of the control signals CTL-1 to CTL-N of the ECUs 1 to N, the switching module 390 may be open (i.e. off) to disconnect the motor shorting components 370 from the DC bus 350-N so that the motor shorting components 370 of the ECU N cannot short the motor windings 215-1, 215-2, 215-3. The control signal CTL-1 to CTL-N may be generated by the ECU 1 to N when the ECU 1 to N is properly initialized or activated or is in an active status. For example, each of the first switch drivers (e.g. inverter gate driver) 330-1 to 330-N of the ECUs 1 to N or the controllers 380-1 to 308-N of the ECUs 1 to N may generate the control signal CTL-1 to CTL-N, but not limited thereto.

In the exemplary embodiment of FIG. 3, the switching module 390 may be connected between one node (e.g. high voltage node) of the DC bus 350-N and the first resistors R1 connected with the second switches (e.g. lower side switches) SW2*a*-N, SW2*b*-NI, SW2*c*-N. However, the switching module 390 may be connected to any part of the motor shorting components 370 or the inverter INV N that is capable of selectively connecting or disconnecting the motor shorting components 370 with or from the DC bus 350-N.

The switching module 390 may include a fourth switch SW4. The fourth switch SW4 may be a normally-on type switch which is normally closed (ON), and be turned off when receiving a voltage which is more than a threshold (or less than the threshold). For example, the switching module 390 may use a Solid-State Relay (SSR) as the fourth switch SW4. The SSR is an electronic switching device that switches on or off when a small external voltage is applied across its control terminals. For example, the SSR includes a sensor which responds to an appropriate input (control signal), a solid-state electronic switching device which switches power to the load circuitry, and a coupling mechanism to enable the control signal to activate this switch without mechanical parts. The SSR may provide complete electrical isolation between its input and output contacts with its output acting like a conventional electrical switch in that it has very high, almost infinite resistance when non-conducting (open), and a very low resistance when conducting (closed). However, any switch, for example, a transistor such as depletion mode MOSFET and junction gate field-effect transistor (JFET), which is normally on and can be turned off when receiving the voltage above a threshold (or below the threshold) can be used instead of the SSR.

Diodes D1 are connected to terminals C 1 to C N configured to receive the control signals CTL-1 to CTL-N from the ECUs 1 to N, respectively. The diodes D1 can perform a OR function for the control signals CTL-1 to CTL-N so that at least one of the control signals CTL-1 to CTL-N received through the terminals C 1 to C N can be provided to the fourth switch SW4.

Resistors R3 are connected to terminals G 1 to G N which are connected to grounds of the electric control units ECUs 1 to N, respectively. The resistors R3 may be configured to provide isolation between the grounds of the electric control units ECUs 1 to N.

The fourth switch SW4 may be turned on (i.e. closed) or turned off (i.e. open) in response to one or more of the control signals CTL-1 to CTL-N. When receiving none of the control signals CTL-1 to CTL-N from the ECU 1 to N, the fourth switch SW4 is closed, and the motor shorting components 200 can receive the voltage that can short the motor windings 215-1, 215-2, 215-3. However, when receiving at least one of the control signals CTL-1 to CTL-N from the ECUs 1 to N which are in an active status, the fourth switch SW4 is turned off, and the motor shorting components 370 are disconnected from the DC bus 350-N so that the motor shorting components 370 cannot short the motor windings 215-1, 215-2, 215-3.

The standby ECU N may be inactive, disabled, failed or in a high impedance state as well as other ECUs such as ECUs 1 to N-1. When the first switch driver 330-N of the standby ECU N does not generate the drive signals because it is inactive, disabled, failed or in a high impedance state, the switches SW1a-N, SW1b-N, SW1c-N SW2a-N, SW2b-N, SW2c-N do not receive the drive signals from the first switch driver 330-N. However, in the embodiment of FIG. 3, the DC bus 350-N can supply the voltage to the second switches SW2a-N, SW2b-N, SW2c-N and the third switches SW3a-N, SW3b-N, SW3c-N through the first resistors R1. The voltage, pulled up by the first resistors R1, may turn on the second switches SW2a-N, SW2b-N, SW2c-N as well as the third switches SW3a-N, SW3b-N, SW3c-N. For instance, the voltage, which is generated by the DC bus 350-N, pulled up by the first resistors R1 and input to the second terminals (e.g. gate) of the second switches SW2a-N, SW2b-N, SW2c-N, exceeds a threshold voltage which is capable of turning on the second switches SW2a-N, SW2b-N, SW2c-N, and therefore, the second switches SW2a-N, SW2b-N, SW2c-N are closed. Likewise, the third switches SW3a-N, SW3b-N, SW3c-N are turned on. In turn, the motor windings 215-1, 215-2, 215-3 are shorted to one node (e.g. low voltage node) of the DC bus 350-N through the second switches SW2a-N, SW2b-N, SW2c-N. All of the motor windings 215-1, 215-2, 215-3 of the motor 210 may be shorted together by closing the second switches (e.g. lower side switches) SW2a-N, SW2b-N, SW2c-N to produce a three phase short at the inverter INV N of the standby ECU N inputs to the motor 210. Accordingly, the voltage pulled up by the first resistors R1 may force all the second switches (e.g. lower side switches) SW2a-N, SW2b-N, SW2c-N to be on (short circuit) while all the first switches (e.g. upper side switches) SW1a-N, SW1b-N, SW1c-N are turned off (open circuit). This results in the braking of the motor 210. The motor 210 may act as a brake and/or damper to oppose any motion applied to the motor 210.

When the first switch driver 330-N of the standby ECU N is active, the first switch driver 330-N may generate one or more of the drive signals, and control the second switches SW2a-N, SW2b-N, SW2c-N not to short the motor windings 215-1, 215-2, 215-3 or to remove the short of the motor windings 215-1, 215-2, 215-3 by turning on and off the second switches SW2a-N, SW2b-N, SW2c-N. The second resistors (e.g. pull down resistors) R2 may have greater resistance than the first resistors (e.g. pull up resistors) R1 so that when the switch drivers 330-N and 340-N are inactive or passive, the voltage divider R1-R2 provide enough turn on voltage to the second terminals (e.g. gates) of the second switches SW2a-N, SW2b-N, SW2c-N and the third switches SW3a-N, SW3b-N, SW3c-N. For example, the resistance of the first resistors (e.g. pull up resistors) R1 may be 2,000 to 5,000Ω while the resistance of the second resistors (e.g. pull down resistors) R2 may be 20,000 to 50,000Ω, but not limited thereto.

Additionally, when any one of the ECUs 1 to N is properly initialized or activated or is in an active status, that ECU outputs the control signal CTL 1 to CTL N to the fourth switch SW4, and in turn the fourth switch SW4 disconnects the motor shorting circuit 370 from the DC bus 350-N so that the motor shorting circuit 370 is disconnected from the power source and cannot short the motor windings 215-1, 215-2, 215-3.

For example, before the startup of the system 300, the first switch driver (e.g. inverter gate driver) 330-N and the second switch driver (e.g. phase disconnect gate driver) 340-N are inactive, but the power source 200-N supplies voltage through the DC bus 350-N. The voltage, which is supplied by the DC bus 350-N and pulled up by the first resistors R1, may turn on the second switches (or lower side switches) SW2a-N, SW2b-N, SW2c-N so that the motor windings 215-1, 215-2, 215-3 can be shorted together. This provides the braking torque of the motor 210. At the startup of the system 300, the controllers 380-1 to 380-N initialize and set first commands to the first switch drivers (e.g. inverter gate driver) 330-1 to 330-N and the second switch driver (e.g. phase disconnect gate driver) 340-1 to 340-N. In response to the first commands of the controllers 380-1 to 380-N, the first switch drivers (e.g. inverter gate driver) 330-1 to 330-N initialize the first switches SW1a-1 to SW1c-N and the second switches SW2a-1 to SW2c-N of ECU 1 to N to be turned off, and the second switch drivers (e.g. phase disconnect gate driver) 340-1 to 340-N initialize the third switches SW3a-1 to SW3c-N to be turned on. And, at least one of the ECUs 1 to N which are properly initialized or activated outputs the control signal(s) CTL-1 to CTL-N, and the fourth switch SW4 disconnects the motor shorting circuit 370 from the DC bus 350-N in response to the control signal(s) CTL-1 to CTL-N. This may result in safely disabling or removing the short of the motor windings 215-1, 215-2, 215-3. Then, the primary ECU 1 starts to control the motor 210 through the inverter INV 1, the first switch driver (e.g. inverter gate driver) 330-1, and the second switch driver (e.g. phase disconnect gate driver) 340-1.

While the three-leg inverters INVs 1 to N are depicted in FIG. 3 as a circuit controlling the motor 210, the present disclosure is not limited to this type of the inverter. In accordance with the embodiment of the present disclosure, the inverters INVs 1 to INV N can be any type of an inverter which utilizes one or more switching elements to control voltage across the phases of the motor 210.

Therefore, when the ECUs 1 to N are inactive, disabled, failed or in a high impedance status, the motor shorting components 370 are configured to short the motor windings 215-1 to 215-M so that the motor 210 can generate the braking torque. In the case that the motor 210 is included in the feedback actuator or steering feel actuator 28, the feedback actuator or steering feel actuator 28 may generate the braking torque to the steering wheel 20 and prevent from providing uncomfortable feeling of being separated from the road wheels to the driver or oversteering the vehicle by the driver when all or some electric control units of the feedback actuator or steering feel actuator 28 are disabled or failed.

In some embodiments of the present disclosure, the motor for the feedback actuator or steering feel actuator is described, but the present disclosure is not limited thereto. However, one skilled in the art will recognize that the motor control system according to the present disclosure could be applied to or used with any motor that requires braking and/or damping torque.

Although the example embodiments have been described in detail, it should be understood that various changes, substitutions and alterations can be made herein without departing from the spirit and scope of the application as defined by the appended claims.

In the present disclosure, relational terms such as first and second, and the like may be used solely to distinguish one entity or action from another entity or action without necessarily requiring or implying any actual such relationship or order between such entities or actions. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements. The term "connected" or "coupled" may mean direct or indirect connection unless otherwise specified.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A motor control system, comprising:
a motor comprising a plurality of motor windings; and
a plurality of electric control units electrically connected with the motor, each of the electric control units comprising an inverter configured to receive direct current (DC) voltage and output alternating current (AC) voltage to the motor windings to control the motor,
wherein at least one of the electric control units comprises:
a DC bus connected to a power source;
first switches, each of the first switches connected with a respective one of the motor windings;
second switches, each of the second switches connected with the DC bus and a respective one of the motor windings, wherein each of the second switches is paired with a respective one of the first switches;
a first switch driver configured to generate drive signals to drive the first and second switches;
first resistors, each of the first resistors connected between the DC bus and a respective one of the second switches,
wherein:
the DC bus has first and second nodes,
one of the second switches has:
a first terminal connected with one of the first switches, one of the motor windings and one of the first resistors connected to the first node of the DC bus;
a second terminal configured to receive one of the drive signals of the first switch driver; and
a third terminal connected with the second node of the DC bus,
one of the first resistors is connected between the first node of the DC bus and the first terminal of the one of the second switches, and
wherein the at least one of the electric control units further comprises second resistors, wherein one of the second resistors having greater resistance than the first resistors is connected between the second and third terminals of the one of the second switches.

2. The system of claim 1, wherein the DC bus is configured to supply voltage to the second switches through the first resistors, each of the first resistors connected between the DC bus and a respective one of the second switches, so that the second switches short the motor windings in a state that the first switch driver does not generate the drive signals.

3. The system of claim 2, wherein the first switch driver is configured to generate one or more of the drive signals that control the second switches not to short the motor windings.

4. The system of claim 1, wherein the first resistors are configured to pull up the voltage supplied to the second switches by the DC bus.

5. The system of claim 1, wherein the DC bus is configured to turn on the second switches by supplying voltage, pulled up by the first resistors, to the second switches to short the motor windings in a state that the first switch driver does not generate the drive signals.

6. The system of claim 1, wherein the at least one of the electric control units further comprises second resistors, wherein each of the second resistors having greater resistance than the first resistors is connected with a respective one of the second switches so that one or more of the drive signals of the first switch driver input to the second switches cause the second switches not to short the motor windings.

7. The system of claim 1, wherein the at least one of the electric control units further comprises:
third switches, each of the third switches connected between a respective one of the motor windings and a point between the paired first and second switches; and a second switch driver configured to control the third switches to selectively connect or disconnect the at least one of the electric control units with the motor windings.

8. The system of claim 1, wherein the second switches are configured to be turned on by voltage of the DC bus supplied through the first resistors so that the second switches short the motor windings to the second node of the DC bus in a state that the first switch driver does not generate the drive signals.

9. The system of claim 1, wherein:
the DC bus has first and second nodes,
one of the first switches has:
   a first terminal connected with the first node of the DC bus;
   a second terminal configured to receive one of the drive signals of the first switch driver; and
   a third terminal connected with one of the second switches and one of the motor windings,
the one of the second switches has:
   a first terminal connected with the one of the first switches and the one of the motor windings;
   a second terminal configured to receive another of the drive signals of the first switch driver; and
   a third terminal connected with the second node of the DC bus, and
one of the first resistors is connected between the first node of the DC bus and the second terminal of the one of the second switches.

10. The system of claim 9, wherein the at least one of the electric control units further comprises second resistors, wherein one of the second resistors having greater resistance than the first resistors is connected between the second and third terminals of the one of the second switches.

11. The system of claim 9, wherein the at least one of the electric control units further comprises:
third switches, one of the third switches connected between the one of the motor windings and a point between the one of the first switches and the one of the second switches; and
a second switch driver configured to control the third switches to selectively connect or disconnect the at least one of the electric control units with the motor windings.

12. The system of claim 1, wherein:
the DC bus is configured to supply voltage to the second switches through the first resistors, each of the first resistors connected between the DC bus and a respective one of the second switches, to turn on the second switches so that the second switches short the motor windings in a state that the first switch driver does not generate the drive signals, and
the first switch driver is configured to generate one or more of the drive signals that turn off the second switches not to short the motor windings.

13. The system of claim 1, wherein the DC bus is configured to, when all of the electric control units are disabled, supply voltage to the second switches of the at least one of the electric control units through the first resistors so that the second switches of the at least one of the electric control units short the motor windings.

14. A motor control system, comprising:
a motor comprising a plurality of motor windings; and
a plurality of electric control units electrically connected with the motor, each of the electric control units comprising an inverter configured to receive direct current (DC) voltage and output alternating current (AC) voltage to the motor windings to control the motor,
wherein at least one of the electric control units comprises:
   a DC bus connected to a powersource, the DC bus having first and second nodes;
   a first switch driver configured to generate drive signals to drive first and second switches;
   the first switches, one of the first switches having a first terminal connected with the first node of the DC bus, a second terminal configured to receive one of the drive signals of the first switch driver, and a third terminal connected with one of the second switches and one of the motor windings;
   the second switches, the one of the second switches having a first terminal connected with the one of the first switches and the one of the motor windings, a second terminal configured to receive another of the drive signals of the first switch driver, and a third terminal connected with the second node of the DC bus, and
   the first resistors, the one of the first resistors connected between the first node of the DC bus and the second terminal of the one of the second switches, and
wherein:
the at least one of the electric control units further comprises second resistors, wherein one of the second resistors having greater resistance than the first resistors is connected between the second and third terminals of the one of the second switches, and
the first switch driver is configured to output, to the second switches, one or more of the drive signals that control the second switches not to short the motor windings.

15. The system of claim 14, wherein the second switches are configured to be turned on by voltage of the DC bus supplied through the first resistors so that the second switches short the motor windings to the second node of the DC bus in a state that the first switch driver does not generate the drive signals.

16. The system of claim 14, wherein the first resistors are configured to pull up the voltage supplied to the second switches by the DC bus.

17. The system of claim 14, wherein the at least one of the electric control units further comprises:
third switches, one of the third switches connected between the one of the motor windings and a point between the third terminal of the one of the first switches and the first terminal of the one of the second switches; and
a second switch driver configured to control the third switches to selectively connect or disconnect the at least one of the electric control units with the motor windings.

* * * * *